United States Patent

[11] 3,615,787

[72] Inventors Hideo Teramoto;
 Tatsuo Kasakawa, both of Tokyo, Japan
[21] Appl. No. 883,608
[22] Filed Dec. 9, 1969
[45] Patented Oct. 26, 1971
[73] Assignee Nihon Cement Co., Ltd.
 Tokyo, Japan
[32] Priority Aug. 28, 1969
[33] Japan
[31] 44/67615

[54] METHOD OF THE PRODUCTION OF SUPERHIGH EARLY STRENGTH CEMENTS
1 Claim, No Drawings

[52] U.S. Cl.................................................. 106/102,
 106/89, 106/100
[51] Int. Cl..................................................... C04b 7/48,
 C04b 7/52
[50] Field of Search............................................ 106/89,
 101, 102, 100

[56] References Cited
 UNITED STATES PATENTS
3,017,246 1/1962 Kamlet.......................... 106/100
2,970,925 2/1961 Dyckerhoff................... 106/100
2,061,972 11/1936 Reed-Lewis................... 106/100
 FOREIGN PATENTS
284,295 5/1928 Great Britain................. 106/100

Primary Examiner—Tobias E. Levow
Assistant Examiner—W. T. Scott
Attorney—Stevens, Davis, Miller & Mosher ABSTRACT: Method of the production of superhigh early strength cements which comprises using, in addition to the materials such as limestone, clay and pyrite cinder generally used as the raw materials for portland cements, a raw material containing as the major or minor component a chromium compound such as chromite and a raw material containing as the major or minor component a fluoride such as fluorite, in the preparation of raw mixtures which are obtained either by mixing crushed or ground said raw materials or by further grinding the raw mixtures, mixing said raw materials in such a ratio as to provide contents of tricalcium silicate ($3CaO \cdot SiO_2$), tricalcium aluminate ($3CaO \cdot Al_2O_3$) chromium oxide ($Cr_2O_3$) and fluorine (F) in clinkers which are obtained by sintering said raw mixtures within the ranges set forth in the table

| Compound or element | Scope of content (%) |
|---|---|
| Tricalcium silicate ($3CaO \cdot SiO_2$) | 65 to 85 |
| Tricalcium aluminate ($3CaO \cdot Al_2O_3$) | 7 to 13 |
| Chromium oxide ($Cr_2O_3$) | 0.3 to 1.5 |
| Fluorine (F) | 0.2 to 1.0. | in the preparation of cements by crushing mixtures of said clinkers and gypsums, adding to said clinkers such amounts of gypsum that contents of sulfuric anhydride ($SO_3$) in said cements are within a range between 1.5 and 4.5 percent and grinding the resulting cements to produce specific surface areas of said cements with a range between 4,500 and 6,000 $cm^2/g$.

3,615,787

1

METHOD OF THE PRODUCTION OF SUPERHIGH EARLY STRENGTH CEMENTS

BACKGROUND OF THE INVENTION

1. Field of the Invention

This invention relates to a method of the production of superhigh early strength cements which will harden in a short period of time to produce a high strength, which method is suitable for industrial operation. The term, "portland cements," as employed herein, includes portland cement, portland blast-furnace cement, silica cement, fly ash cement and the like.

2. Description of the Prior Art

Portland cements are used in large quantities as materials for concretes for engineering and building works, concretes or mortars for the production of concrete products or cement secondary products. This is because the portland cements have a variety of advantages such as easiness in producing a various forms of constructions, concrete products or cement secondary products, relatively high degrees of strength, durability and fireproofness of the concretes and mortars which are derived from portland cements and cheapness in cost.

On the other hand, portland cements are relatively slow in hardening rate and required to subject the placed or molded material to curing by allowing to stand for several days before it is hardened to exert desired strength.

Though there will not be produced remarkable inconvenience by requirement of the curing for several days in usual engineering and building works, curing of the concretes used in paving works of heavy traffic roads, mending works of roads or bridges in use, mending or enlarging works of runways in use in the airport and the like is required to be completed in a very short period of time in order to complete the work as short as possible.

Moreover, it is desired in concrete works in the cold district to use a concrete that will be hardened in a short period of time in order to prevent trouble of possible poor hardening of the concrete owing to freezing of the moisture prior to the hardening.

In such concrete works as of urgent necessity and in the cold district high early strength portland cements of high-hardening rates, or additionally, a variety of admixtures with effects of promoting the hardening of concrete are employed. Even in such cases, however, curing period longer than 2 or 3 days is needed and in some instances the results are not satisfactory using such means.

In addition to the inconvenience as mentioned above addition of some sorts admixtures used for promoting the hardening of concrete may be causative of reduction in long age strength or physical and chemical durability of the concrete or may induce higher tendency of corroding the reinforcing steel in the reinforced concrete. Under certain conditions, use of such an admixture is prohibited in accordance with the standard specification of concrete work. No admixture, therefore, can be used in many works of urgent necessity.

Alternatively, means such as the use of aluminous cements of very large hardening rate, adhesives containing plastics as the main component, asphalt or the like are applied in place of the portland cements. However, complicated directions for use are needed with the aluminous cement and the adhesive, as compared with the portland cements, and the former two are very expensive. They are therefore unsuitable in the concrete works in which a large quantity of the cement or adhesive is needed. On the other hand, application of asphalt is so limited as for use in pavement asphalt concrete due to its low strength and fireproofness after hardening.

Finally, in the production of concrete products such as concrete poles, concrete piles and members of prefab building or cement secondary products such as cement slates and cement asbestos pipes curing at normal temperatures of the concretes or mortars after molding requires several days or longer with the result that a number of molds and large sites must be used, or otherwise, in order to reduce the period of

2 cure by promoting the hardening by means of heating with normal or high-pressure steam in a steam-curing room or autoclave there must be provided facilities such as a boiler, steam-curing room or autoclave and fuel for the generation of steam with the result of increase in facility and operation costs. Such means, therefore, can hardly be applied to large products or concrete products produced at or near the field of construction work.

SUMMARY OF THE INVENTION

This invention is directed to dissolving such problems as described above accompanied by the use of portland cements. It is an object of this invention to provide a method suitable for industrial operation of the production of superhigh early strength cements which will harden in a short period of time to produce a high strength.

The method of the preparation of superhigh early strength cements according to this invention is characterized by the use, in addition to the materials such as lime stone, clay and pyrite cinder generally used as the raw materials for portland cements, of a raw material containing as the major or minor component a chromium compound such as chromite (called raw material of chromium component hereinbelow) and a raw material containing as the major or minor component a fluoride such as fluorite (called raw material of fluoride component hereinbelow), in the preparation of raw mixtures which are obtained either by mixing crushed or ground said raw materials or by further grinding the raw mixtures, mixing of said raw materials in such a ratio as to provide contents of tricalcium silicate ($3CaO \cdot SiO_2$), tricalcium aluminate ($3CaO \cdot Al_2O_3$) chromium oxide ($Cr_2O_3$) and fluorine (F) in clinkers which are obtained by sintering said raw mixtures, within the ranges set forth in Table 1,

TABLE 1

| Compound or element | Scope of content (%) |
|---|---|
| Tricalcium silicate ($3CaO \cdot SiO_2$) | 65 to 85 |
| Tricalcium aluminate ($3CaO \cdot Al_2O_3$) | 7 to 13 |
| Chromium oxide ($Cr_2O_3$) | 0.3 to 1.5 |
| Fluorine (F) | 0.2 to 1.0 | in the preparation of cements by crushing mixtures of said clinkers and gypsums, addition to said clinkers of such amounts of gypsum that contents of sulfuric anhydride ($SO_3$) in said cements are within a range between 1.5 and 4.5 percent and grinding of the resulting cements to produce specific surface areas within a range between 4,500 and 6,500 cm.$^2$/g. The contents are expressed in terms of percent by weight throughout the specification. The term, "gypsum," as employed herein, includes the natural gypsum as defined as gypsum according to Japanese Industrial Standard JIS R 9151 (specification for the natural gypsum for cements) and other corresponding chemical and byproduct gypsums.

In the above table the contents of tricalcium silicate and tricalcium aluminate in the clinker are respectively calculated, following chemical analysis of the clinker in the manner described in JIS R 5202 (Chemical Analysis of Portland Cement) by the following equation from the contents of calcium oxide, silica, alumina, ferric oxide and sulfuric anhydride:

$3CaO \cdot SiO_2 = (4.07 \times CaO) - (7.60 \times SiO_2) - (6.72 \times Al_2O_3) - (1.48 \times Fe_2O_3) - (2.85 \times SO_3)$ $3CaO \cdot Al_2O_3 = (2.65 \times Al_2O_3) - (1.69 \times Fe_2O_3)$ wherein $3CaO \cdot SiO_2$, $3CaO \cdot Al_2O_3$, $CaO$, $SiO_2$, $Al_2O_3$, $Fe_2O_3$ and $SO_3$ represent contents of tricalcium silicate, tricalcium aluminate, calcium oxide, silica, alumina, ferric oxide and sulfuric anhydride in the clinker, respectively. The calculated contents of tricalcium silicate and tricalcium aluminate are expressed in round numbers. The compounds and element shown in table 1 means those which can be assayed for the contents by the method according to JIS R 5202 or by a conventional chemical assay method, or compounds which can be calculated for the contents by the use of the above-cited equations for the calculation, but does not necessarily mean that the compounds or element must be contained in the clinker in the shown formulas as they are. The specific surface area of the cement is measured according to the method described under 7.1 (Specific Surface Area Test) in JIS R 5202 (Physical Testing Methods of Cement).

Burning of the clinker can be further facilitated by the addition, besides the raw materials mentioned above, of a small amount of a raw material containing as the major or minor component a manganese compound such as manganese ore and a raw material containing as the major or minor component a titanium compound such as rutile or ilmenite. The addition may be omitted.

As the factors influencing upon the hardening rate or strength of Portland cement are mentioned chemical compositions or compound compositions of the clinker, ratio of the addition of gypsum, fineness of the cement and the like. Generally, it is known that higher contents of tricalcium silicate and tricalcium aluminate in the clinker or larger surface area of the cement results in hardening in a shorter period of time, which accordingly produces higher strength at the early age.

On the other hand, however, the raw mixtures which produce the clinker of higher tricalcium silicate content are lower in reactivity and require a higher burning temperature or a longer burning time, which in turn associate with a larger amount of fuel consumption and a lower capacity of the burning kiln. Moreover, higher content of tricalcium aluminate in the clinker leads to production of the cement exerting lower resistance to chemical corrosion such as with sulfate solution. Larger surface area of the cement results in larger shrinkage on hardening and drying of concretes or mortars produced with the cement, which causes higher tendency to crack.

It is therefore impossible in a commercial sense to produce cement of good quality only by increasing content of tricalcium silicate and tricalcium aluminate in the clinker or specific surface area of the cement, although such increase would produce cement of high strength at the early age.

As the result of extensive studies on superhigh early strength cements we have found a method of the production of superhigh early strength cement which exert early strength remarkably higher, shrinkage on hardening and drying smaller and resistance to sulfate approximately equal to conventional high early strength cements, and moreover, the clinker of which can be burnt as easily as the clinker or normal portland cements or high early strength cements.

Results of the tests with the superhigh early strength cements of this invention are shown in tables 2 to 4.

Table 2 shows the results of the tests in which natural gypsum was added to clinkers of various contents of tricalcium silicate and tricalcium aluminate to a content of sulfuric anhydride in the cements as high as 2.5 percent, the resulting cements were ground to specific surface areas of approximately 4,500 cm²/g. and measurements were made on the strengths at ages of 1 and 3 days and the resistance to sulfate.

In the tests, lime stone, clay, silica and pyrite cinder were respectively ground in a ball mill to pass through the standard sieve 88$\mu$ according to JIS Z 8801 (specification for standard sieve) with the residue remaining on the sieve as much as about 2 to 5 percent and were mixed together at appropriate ratios depending upon the chemical compositions of the raw materials assayed beforehand by chemical analyses followed by addition of calcium fluoride of reagent grade to a fluorine content in the clinker of 0.4 percent. The resulting mixtures were then ground in a ball mill to pass through the standard sieve 88$\mu$ with the residue remaining on the sieve as much as about 1 percent for use as raw mixtures. To the raw mixtures were added small amounts of gum arabic and water and the resulting mixtures were formed to bars about 1 cm. in diameter and about 10 cm. in length. The bars were dried and gradually heated in an electric furnace to an inner temperature of about 1,450°C., at which temperature burning was effected until the contents of free lime became about 1 percent to produce clinkers. To the clinkers were added gypsum to contents of sulfuric anhydride in the cements as much as about 2.5 percent and the resulting mixtures were ground in a ball mill to a specific surface area of about 4,500 cm.²/g. to prepare samples of the cements.

The contents of free lime in the clinkers were measured according to the commonly known Lerch-Bogue method in which free lime in the finely ground sample was extracted with glycerin-ethanol mixed solution followed by titration using the standard ethanol solution of ammonium acetate. Strength of the cement was measured by the method described under 10 (Strength Test) in JIS R 5201 (Physical Testing Methods of Cement). Resistance to sulfate was tested by the method according to ASTM C452-64 (Standard Method of Test for Potential Expansion of Portland Cement Mortars Exposed to Sulfate), in which the result of the test is expressed in terms of expansion of the specimen at each age and the samples exerting smaller expansion coefficient is estimated to have higher resistance to sulfate.

As shown in table 2, the strength at the age of 1 or 3 days is higher with higher content of tricalcium silicate in samples Nos. 1 to 6 which are equal in content of tricalcium aluminate and is higher with higher content of tricalcium aluminate in samples Nos. 7 to 12 which are equal in content of tricalcium silicate. Sample No. 2 which contains 65 percent tricalcium silicate and 10 percent tricalcium aluminate and Sample No. 8 which contains 75 percent of the former and 7 percent of the latter show slightly lower strengths, while sample No. 13 which contains the same amount of tricalcium silicate (65 percent) as sample No. 2 and sample No. 14 which contains the same amount of tricalcium aluminate (7 percent) as sample No. 8 show higher values. These data indicate that adequate combination of contained tricalcium silicate and aluminate produces a cement of high strength at the early age. On the other hand, the test results of resistance to sulfate indicate that the samples with higher contents of tricalcium aluminate tend to exhibit larger expansion. In conclusion, the ranges of contents of tricalcium silicate and aluminate preferable for the clinker producing cement with high early strength as well as not too low resistance to sulfate are considered to be 65 to 85 percent and 7 to 13 percent respectively.

TABLE 2

| Sample No. | Content in clinker, percent | | | Specific surface area of cement (cm.²/g.) | Strength of cement (kg./cm.²) | | | | Resistance to sulfate (expansion), percent | | | |
| | Tricalcium silicate | Tricalcium aluminate | Free lime | | Bending strength | | Compressive strength | | | | | |
| | | | | | 1 d. | 3 d. | 1 d. | 3 d. | 7 d. | 14 d. | 28 d. | 56 d. |
| 1 | 60 | 10 | 0.7 | 4,420 | 26.7 | 49.0 | 93 | 212 | 0.042 | 0.055 | 0.070 | 0.082 |
| 2 | 65 | 10 | 1.0 | 4,450 | 31.4 | 51.8 | 103 | 209 | 0.036 | 0.049 | 0.061 | 0.078 |
| 3 | 70 | 10 | 1.3 | 4,560 | 35.1 | 54.5 | 154 | 285 | 0.034 | 0.048 | 0.059 | 0.073 |
| 4 | 75 | 10 | 0.8 | 4,520 | 40.2 | 60.5 | 178 | 326 | 0.030 | 0.047 | 0.062 | 0.077 |
| 5 | 80 | 10 | 1.4 | 4,500 | 40.6 | 58.7 | 184 | 318 | 0.035 | 0.054 | 0.063 | 0.085 |
| 6 | 85 | 10 | 1.9 | 4,440 | 38.0 | 57.6 | 159 | 298 | 0.028 | 0.052 | 0.073 | 0.086 |
| 7 | 75 | 5 | 0.7 | 4,480 | 26.5 | 46.9 | 88 | 204 | 0.024 | 0.043 | 0.052 | 0.072 |
| 8 | 75 | 7 | 1.3 | 4,380 | 32.9 | 54.3 | 104 | 240 | 0.027 | 0.045 | 0.056 | 0.070 |
| 9 | 75 | 9 | 1.2 | 4,510 | 34.6 | 60.1 | 160 | 317 | 0.030 | 0.051 | 0.062 | 0.077 |
| 10 | 75 | 11 | 1.5 | 4,600 | 42.3 | 59.8 | 181 | 322 | 0.043 | 0.060 | 0.079 | 0.098 |
| 11 | 75 | 13 | 1.1 | 4,450 | 42.8 | 56.0 | 182 | 307 | 0.051 | 0.073 | 0.094 | 0.112 |
| 12 | 75 | 15 | 1.6 | 4,560 | 43.2 | 58.4 | 178 | 314 | 0.067 | 0.107 | 0.126 | 0.142 |
| 13 | 65 | 13 | 0.9 | 4,580 | 34.4 | 53.2 | 145 | 265 | 0.048 | 0.069 | 0.088 | 0.106 |
| 14 | 85 | 7 | 0.8 | 4,540 | 35.5 | 56.2 | 137 | 288 | 0.024 | 0.052 | 0.050 | 0.081 |

Table 3 shows the results of the tests in which clinkers containing 75 percent tricalcium silicate and 10 percent tricalcium aluminate were prepared from the raw mixtures either as they were or following addition of either or both of chromium oxide ($Cr_2O_3$) and calcium fluoride ($CaF_2$) at various ratios to determine burning time when burnt at 1,450°C. until the contents of free lime in the clinkers became about 1 percent were measured and then gypsum was added to the clinkers thus obtained to give contents of sulfuric anhydride in the cements as high as about 2.5 percent followed by grinding in a ball mill to provide specific surface areas of about 4,500 cm.$^2$/g. to determine the strengths at the ages of 1 and 3 days.

TABLE 3

| Content, percent | | Burning time (min.) | Content of free lime in clinker, percent | Strength of cement (kg./cm.$^2$) | | | |
|---|---|---|---|---|---|---|---|
| Chromium oxide ($Cr_2O_3$) | Fluorine (F) | | | Bending strength | | Compressive strength | |
| | | | | 1 d. | 3 d. | 1 d. | 3 d. |
| 0.0 | 0.0 | 180 | 1.6 | 28.8 | 48.2 | 130 | 245 |
| 0.3 | 0.0 | 180 | 1.3 | 30.6 | 46.7 | 132 | 240 |
| 0.6 | 0.0 | 180 | 1.1 | 30.4 | 48.4 | 125 | 228 |
| 0.9 | 0.0 | 180 | 1.2 | 32.1 | 52.8 | 127 | 272 |
| 1.2 | 0.0 | 180 | 0.7 | 34.2 | 50.9 | 136 | 273 |
| 1.5 | 0.0 | 150 | 1.2 | 34.5 | 51.0 | 132 | 265 |
| 0.0 | 0.2 | 90 | 0.8 | 37.5 | 53.8 | 132 | 268 |
| 0.0 | 0.4 | 60 | 0.8 | 40.2 | 57.5 | 168 | 286 |
| 0.0 | 0.6 | 60 | 0.6 | 42.4 | 59.7 | 162 | 286 |
| 0.0 | 0.8 | 40 | 1.0 | 38.3 | 56.6 | 151 | 270 |
| 0.0 | 1.0 | 30 | 1.2 | 32.2 | 53.4 | 137 | 261 |
| 0.3 | 0.2 | 40 | 1.5 | 41.9 | 59.2 | 183 | 303 |
| 0.3 | 0.4 | 40 | 1.2 | 43.4 | 61.5 | 200 | 317 |
| 0.3 | 0.6 | 30 | 0.8 | 43.6 | 62.4 | 195 | 325 |
| 0.3 | 0.8 | 20 | 0.8 | 40.0 | 61.8 | 172 | 304 |
| 0.3 | 1.0 | 20 | 0.5 | 37.8 | 62.3 | 168 | 322 |
| 0.6 | 1.2 | 40 | 1.3 | 43.6 | 61.7 | 194 | 314 |
| 0.6 | 0.4 | 30 | 1.0 | 45.3 | 64.5 | 206 | 332 |
| 0.6 | 0.6 | 20 | 1.2 | 43.8 | 63.5 | 188 | 326 |
| 0.9 | 0.2 | 30 | 1.2 | 43.1 | 63.8 | 181 | 307 |
| 0.9 | 0.4 | 30 | 1.2 | 46.7 | 62.8 | 193 | 313 |
| 1.2 | 0.2 | 30 | 0.9 | 43.4 | 61.0 | 162 | 304 |
| 1.2 | 0.4 | 20 | 0.8 | 41.8 | 59.7 | 184 | 294 |
| 1.5 | 0.2 | 20 | 1.3 | 37.2 | 58.2 | 152 | 281 |
| 1.5 | 0.4 | 20 | 1.5 | 40.4 | 60.8 | 166 | 302 |

In these tests the raw mixtures were prepared by mixing lime stone, clay, silica and pyrite cinder at appropriate ratios followed, if required, by addition of reagent grade chromium oxide and calcium fluoride in such a way that the contents of chromium oxide and/or fluorine in the clinkers were the figures under content in table 3 and then grinding the resulting mixtures in a ball mill to give the raw mixtures. The burning time was determined from the time when the inner temperature of the electric furnace in which the mixture was heated reached 1,450°C. until the time when the free lime contents in the clinkers were reduced to about 1 percent.

As shown in table 3 the raw mixture when burnt as they were are so low in reactivity that very long periods of time are required to reduce free lime in the clinkers to about 1 percent and the early strengths of the cements prepared from the clinkers thus produced are not satisfactorily high. Although the raw mixtures with either chromium oxide or calcium fluoride are slightly improved in reactivity and the cements produced from such clinkers are slightly higher in early strength, the effects of the addition are not satisfactory. The raw mixtures with chromium oxide and calcium fluoride simultaneously added in adequate amounts, however, produce clinkers with low contents of free lime following short periods of burning time, which in turn produce cements with very high strengths at the ages of 1 and 3 days. From the results of these tests it is considered that the amounts of raw material of chromium component and raw material of fluoride component to be added to the raw mixtures are preferably in such ranges as providing the contents of chromium oxide and fluorine in the clinker in ranges from 0.3 to 1.5 percent and from 0.2 to 1.0 percent respectively.

Table 4 percent the results of the tests in which strengths at the ages of 1 and 3 days and shrinkage on hardening and drying were determined with samples of the cements obtained by adding gypsum at various ratios to the clinker containing 75 percent tricalcium silicate, 10 percent tricalcium aluminate, 0.4 percemtn chromium oxide and 0.4 percent fluorine followed by grinding to give specific surface areas varying within a range from 4,500 to 6,000 cm.$^2$/g.

In table 4 contents of sulfuric anhydride in the cements were shown in place of ratio of the addition of gypsum. Measurement on the shrinkage on hardening and drying was made by the method according to JCEAS H–11–1961 (Standard Method of Test for Length Change of Mortars on Hardening and Drying), a standard test method established by the Cement Association of Japan. Summary of the test method is as follows:

To one part of the sample are added 2 parts of Toyoura standard sand and 0.6 parts of water and the mixture kneaded to give a mortar. The mortar is filled in the mold for the test of strength according to JIS, cured in humid air for 48 hours and form removed to give a specimen. The specimen is cured in water for 5 days, followed by keeping in a store box respectively adjusted to a humidity of 76 percent or 44 percent using as the humidity conditioner saturated aqueous solution of sodium chloride or potassium carbonate. After a given period of time the specimen is discharged and shrinkage coefficient is determined by exactly measuring the distance between the pitch lines on the milk glasses beforehand inserted near both ends of the specimen and calculating on the basis of the distance between the pitch lines just prior to the storing.

The shrinkage coefficient on hardening and drying is indicative of the tendency of concrete or mortar prepared with the cement to shrink on hardening and drying. The smaller coefficient indicates that the concrete or mortar is smaller in shrinkage on hardening and drying with less possibility of cracking.

As shown in table 4 in samples nos. 51 to 57 which have approximately equal specific surface area, larger content of sulfuric anhydride gives rise to higher early strength and smaller shrinkage coefficient on hardening and drying. In Samples 55 and 58 to 60, which contain equal content of sulfuric anhydride, larger specific surface area gives rise to higher early strength but larger shrinkage coefficient on hardening and drying. The slightly lower early strengths of Samples 51 and 52, which respectively contain 1.5 and 2.0 percent sulfuric anhydride and both have a specific surface area of about 4,500 cm.$^2$/g., than those of the other samples and the higher early

TABLE 4

| Sample No. | Content of sulfuric anhydride (percent) | Specific surface area (cm.$^2$/g.) | Bending strength (kg./cm.$^2$) | | Compressive strength (kg./cm.$^2$) | | Shrinkage coefficient on hardening and drying ($10^{-4}$) | | | |
|---|---|---|---|---|---|---|---|---|---|---|
| | | | 1 d. | 3 d. | 1 d. | 3 d. | 7 d. | 28 d. | 56 d. | 91 d. |
| 51 | 1.5 | 4,580 | 36.3 | 59.9 | 148 | 292 | 4.45 | 13.05 | 16.36 | 17.96 |
| 52 | 2.0 | 4,550 | 39.7 | 60.8 | 166 | 310 | 4.29 | 12.18 | 14.28 | 15.70 |
| 53 | 2.5 | 4,620 | 43.4 | 62.5 | 178 | 329 | 4.48 | 13.26 | 17.20 | 18.32 |
| 54 | 3.0 | 4,530 | 45.9 | 63.7 | 194 | 336 | 3.65 | 10.42 | 12.71 | 14.44 |
| 55 | 3.5 | 4,480 | 47.2 | 65.0 | 210 | 341 | 2.93 | 7.90 | 9.44 | 11.67 |
| 56 | 4.0 | 4,540 | 49.0 | 64.6 | 214 | 331 | 2.63 | 7.75 | 9.13 | 11.48 |
| 57 | 4.5 | 4,550 | 46.5 | 59.3 | 199 | 318 | 2.63 | 7.47 | 9.04 | 11.73 |
| 58 | 3.5 | 5,020 | 52.3 | 65.4 | 224 | 325 | 3.08 | 8.06 | 9.55 | 11.99 |
| 59 | 3.5 | 5,560 | 52.8 | 66.0 | 233 | 344 | 3.18 | 8.32 | 9.72 | 12.45 |
| 60 | 3.5 | 6,020 | 54.9 | 64.1 | 251 | 336 | 3.24 | 8.48 | 9.64 | 12.82 |
| 61 | 1.5 | 5,970 | 44.3 | 61.4 | 185 | 318 | 4.64 | 13.42 | 17.56 | 18.80 |
| 62 | 2.0 | 6,040 | 47.8 | 64.4 | 192 | 338 | 4.33 | 12.37 | 14.11 | 15.18 | strengths of samples 61 and 62, which are equal in content of sulfuric anhydride but have a specific surface area of 6,000 cm.$^2$/g, indicate that appropriate combination of the content of sulfuric anhydride and specific surface area may produce cement of high early strength. From these results content of sulfuric anhydride and specific surface area preferable for the cements which have a high early strength and exert a small shrinkage coefficient on hardening and drying are considered to be respectively in ranges from 1.5 to 4.5 percent and from 4,500 to 6,000 cm.$^2$/g.

DESCRIPTION OF THE PREFERRED EMBODIMENTS

In order to illustrate embodiments of the method of the preparation of superhigh early strength cements described above examples are given below.

EXAMPLE 1

Lime stone, clay, silica, pyrite cinder, chromite and fluorite were respectively ground in a ball mill to pass through the standard sieve 88μ with the residue remaining on the sieve as much as about 2 to 5 percent, and were mixed together at an appropriate ratio depending upon the chemical composition of each raw material. The resulting mixture was then ground in a ball mill to pass through the standard sieve 88μ with the residue remaining on the sieve as much as about 1 percent for use as the raw mixture. The raw mixture was burnt in a rotary kiln to a content of free lime in the clinker as much as about 1 percent. There was obtained a clinker containing 74 percent tricalcium silicate, 10 percent tricalcium aluminate, 0.5 percent chromium oxide and 0.4 percent fluorine. To the clinker was added gypsum to give a content of sulfuric anhydride in the cement as much as 3.3 percent and the mixture was ground in a ball mill to a specific surface area of 5,000 cm.$^2$/g. to yield a superhigh early strength cement.

EXAMPLE 2

The same raw materials and procedures as in example 1 were used to produce a clinker containing 66 percent tricalcium silicate, 13 percent tricalcium aluminate, 0.4 percent chromium oxide and 0.4 percent fluorine. To the clinker was added gypsum to give a content of sulfuric anhydride in the cement as much as 3.7 percent and the mixture was ground in a ball mill to a specific surface area of 5,620 cm.$^2$/g. to yield a superhigh early strength cement.

EXAMPLE 3

The same raw materials and procedures as in example 1 were used to produce a clinker containing 83 percent tricalcium silicate, 8 percent tricalcium aluminate, 0.6 percent chromium oxide and 0.6 percent fluorine. To the clinker was added gypsum to give a content of sulfuric anhydride in the cement as much as 3.1 percent and the mixture was ground in a ball mill to a specific surface area of 4,770 cm.$^2$/g. to yield a superhigh early strength cement.

EXAMPLE 4

The same procedures as in example 1 were repeated except that, in addition to the raw materials used in example 1, manganese ore was used as a raw material to give a clinker containing 75 percent tricalcium silicate, 10 percent tricalcium aluminate, 0.3 percent chromium oxide, 0.4 percent fluorine and 0.3 percent manganese oxide (MnO). To the clinker was added gypsum to give a content of sulfuric anhydride in the cement as much as 3.5 percent and the mixture was ground in a ball mill to a specific surface area of 5,160 cm.$^2$/g. to yield a superhigh early strength cement.

EXAMPLE 5

The same procedures as in example 1 were repeated except that, in addition to the raw materials used in example 1, ilmenite was used as a raw material to give a clinker containing 75 percent tricalcium silicate, 9 percent tricalcium aluminate, 0.4 percent chromium oxide, 0.4 percent fluorine and 0.4 percent titanium oxide ($TiO_2$). To the clinker was added gypsum to give a content of sulfuric anhydride in the cement as much

TABLE 5

| | Samples | | | | | |
|---|---|---|---|---|---|---|
| | Super-high-early-strength cement | | | | | High-early-strength portland cement |
| | Examples | | | | | |
| Test item | 1 | 2 | 3 | 4 | 5 | |
| Specific gravity | 3.12 | 3.10 | 3.13 | 3.11 | 3.11 | 3.13 |
| Fineness: | | | | | | |
| Specific surface area (cm.$^2$/g.) | 5,000 | 5,620 | 4,770 | 5,160 | 5,020 | 4,060 |
| Residue on the standard sieve 88μ, (percent) | 0.2 | 0.2 | 0.3 | 0.3 | 0.2 | 0.9 |
| Setting: | | | | | | |
| Initial set (hr.-min.) | 1-15 | 2-05 | 1-10 | 1-23 | 1-20 | 2-35 |
| Final set (hr.-min.) | 2-05 | 3-20 | 2-25 | 2-13 | 1-50 | 3-45 |
| Soundness | Good | Good | Good | Good | Good | Good |
| Strength (kg./cm.$^2$): | | | | | | |
| Bending strength: | | | | | | |
| 1 d | 51.9 | 48.2 | 48.3 | 53.8 | 50.2 | 25.8 |
| 3 d | 64.3 | 63.8 | 63.6 | 66.0 | 64.4 | 47.2 |
| 7 d | 75.2 | 71.0 | 72.2 | 70.7 | 72.6 | 62.5 |
| 28 d | 79.8 | 79.1 | 78.8 | 77.8 | 79.1 | 78.2 |
| Compressive strength: | | | | | | |
| 1 d | 236 | 208 | 214 | 230 | 221 | 99 |
| 3 d | 348 | 330 | 336 | 354 | 338 | 229 |
| 7 d | 424 | 397 | 420 | 408 | 396 | 345 |
| 28 d | 496 | 473 | 490 | 483 | 478 | 483 |
| Chemical composition (percent): | | | | | | |
| Ignition loss | 1.4 | 1.9 | 1.7 | 1.7 | 1.3 | 0.8 |
| Insoluble residue | 0.2 | 0.4 | 0.3 | 0.3 | 0.3 | 0.6 |
| Silica | 19.7 | 18.3 | 20.1 | 19.2 | 19.5 | 21.4 |
| Alumina | 5.2 | 6.6 | 4.2 | 5.3 | 5.3 | 4.6 |
| Ferric oxide | 2.9 | 3.3 | 2.1 | 2.7 | 2.8 | 2.8 |
| Calcium oxide | 65.4 | 63.7 | 66.3 | 64.9 | 65.2 | 66.0 |
| Magnesia | 0.9 | 1.0 | 0.9 | 0.9 | 1.0 | 1.0 |
| Sulfuric anhydride | 3.3 | 3.7 | 3.1 | 3.5 | 3.3 | 2.4 |
| Total | 99.0 | 98.9 | 98.7 | 98.5 | 98.7 | 99.6 |
| Hardening and drying: | | | | | | |
| Shrinkage coefficient ($10^{-4}$): | | | | | | |
| 7 d | 3.13 | 2.86 | 2.73 | 2.95 | 3.03 | 5.64 |
| 28 d | 5.92 | 7.12 | 8.26 | 7.14 | 8.34 | 15.32 |
| 56 d | 9.27 | 12.08 | 12.33 | 11.28 | 11.85 | 20.47 |
| Resistance to sulfate (expansion) (percent): | | | | | | |
| 7 d | 0.028 | 0.032 | 0.022 | 0.033 | 0.030 | 0.025 |
| 28 d | 0.049 | 0.051 | 0.043 | 0.054 | 0.053 | 0.045 |
| 56 d | 0.074 | 0.077 | 0.072 | 0.078 | 0.081 | 0.067 | as 3.3 percent and the mixture was ground in a ball mill to a specific surface area of 5,020 cm.²/g. to yield a superhigh early strength cement.

Physical tests according to JIS R 5201 (Physical Testing Methods of Cement), chemical analyses according to JIS R 5202 (Chemical Analysis of Portland Cement), and tests on shrinkage on hardening and drying and resistance to sulfate were made with samples of the superhigh early strength cements prepared in examples 1 to 5 as compared with a sample of representative high early strength portland cement. The results are shown in table 5.

As shown in table 5, the bending and compressive strengths at one-day age of the superhigh early strength cements prepared as above are about twice as high as those of the high early strength portland cement and approximately equal to the strengths at 3 day age of the latter. The strengths at 3 day age of the superhigh early strength cements are approximately equal to those at 7 day age of the high early strength portland cement, and the strengths at 7 day age of the former are far higher than the corresponding ones of the latter. These superhigh early strength cements are smaller in shrinkage on hardening and drying and approximately equal in resistance to sulfate to the high early strength portland cement. Concretes or mortars prepared from these cements have large soundness and satisfactory durabilities to chemical corrosion.

Accordingly, use of these superhigh early strength cements in concrete works of urgent necessity or in the cold district makes it possible to complete the work in a shorter period of time due to far shorter period of curing of the concrete, or to prevent freezing of the concrete and is economically advantageous.

Curing period of time of concrete products or cement secondary products can be shortened without need of steam heating of the molded products by the use of these cements, which permits saving of the costs required for facilities such as the boiler, curing room or autoclave and mold and for the fuel.

We claim:

1. A method of producing superhigh early strength hydraulic cements which comprises preparing a mixture including a chromium compound, a fluoride, and conventional raw materials for portland cement; sintering and clinkering said mixture, the composition of the mixture being such that the resulting clinker has a composition within the following ranges,

| | |
|---|---|
| Tricalcium silicate ($3CaO \cdot SiO_2$) | 65 to 85% |
| Tricalcium aluminate ($3CaO \cdot Al_2O_3$) | 7 to 13% |
| Chromium oxide ($Cr_2O_3$) | 0.3 to 1.5% |
| Fluorine (F) | 0.2 to 1.0% | adding to the clinker a sufficient amount of gypsum such that the $SO_3$ content of the material is between 1.5 and 4.5 percent; and grinding the resulting material to a specific surface area between 4,500 and 6,000 cm.²/g.

PO-1050
(5/69)

UNITED STATES PATENT OFFICE
CERTIFICATE OF CORRECTION

Patent No. 3,615,787              Dated October 26, 1971

Inventor(s) Hideo Teramoto and Tatsuo Kasakawa

It is certified that error appears in the above-identified patent and that said Letters Patent are hereby corrected as shown below:

Column 2, line 51, after "anhydride" change "(SO3)" to --$(SO_3)$--;

The chemical formula appearing in column 2, lines 68-70, contains several errors as follows:

Line 68, change "(4.07 x CaO =" to --(4.07 x CaO) - --

Line 68, change "SiO2" to --$SiO_2$--

Line 68, change "(6.72 x Al2O3" to --(6.72 x $Al_2O_3$)--

Line 69, change "Fe23" to --$Fe_2O_3$--

Line 69, change "(2.85 x SO3" to --(2.85 x $SO_3$)--

Line 70, change "3Ca·Al2O3" to --3CaO·$Al_2O_3$--

Column 3, line 51, "clinker or normal" should read --clinker of normal--

Column 6, line 13, "Table 4 percent" should read --Table 4 shows--.

Signed and sealed this 22nd day of August 1972.

(SEAL)
Attest:

EDWARD M.FLETCHER,JR.             ROBERT GOTTSCHALK
Attesting Officer                    Commissioner of Patents